United States Patent [19]

Bischoff et al.

[11] Patent Number: 4,714,969
[45] Date of Patent: Dec. 22, 1987

[54] METHOD AND APPARATUS FOR ERASING A SIGNAL RECORDED ON A MAGNETIC DISK

[75] Inventors: Gene L. Bischoff, Elba; James E. Elly, Buffalo, both of N.Y.

[73] Assignee: Eastman Kodak Company, Rochester, N.Y.

[21] Appl. No.: 776,237

[22] Filed: Sep. 16, 1985

[51] Int. Cl.⁴ .......................... G11B 5/03; G11B 15/48
[52] U.S. Cl. ........................................ 360/66; 360/74.1
[58] Field of Search .................. 360/66, 33.1, 73, 74.1

[56] References Cited

U.S. PATENT DOCUMENTS

| 2,962,560 | 5/1955 | Folse | 360/66 |
| 2,975,239 | 12/1954 | Jackson et al. | 360/66 |
| 3,723,668 | 3/1973 | Ritchey | 179/100 |

FOREIGN PATENT DOCUMENTS

| 59-84311 | 5/1984 | Japan . |
| 59-142706 | 8/1984 | Japan . |
| 60-40505 | 3/1985 | Japan . |
| 60-83203 | 5/1985 | Japan . |

OTHER PUBLICATIONS

Published Japanese Patent Application 58-15822 (Japanese original, English abstract, and complete translation included).
"Erasure of Magnetic Tape", J. G. McKnight, *Journal of the Audio Engineering Society*, Jul. 1963, vol. 11, No. 3, pp. 223–233.

*Primary Examiner*—Vincent P. Canney
*Attorney, Agent, or Firm*—David M. Woods

[57] ABSTRACT

A video signal recorded on a magnetic disk is erased by applying a fixed frequency erasing signal as the disk is decelerating. By recording the erasing signal while slowing the disk, an effect is obtained that is comparable to scanning through a range of increasing frequencies. The high frequencies obtained, which are ordinarily beyond the frequency response of the erasing circuit, are effective in removing the resident video signal and in preparing the disk for a new recording.

12 Claims, 2 Drawing Figures

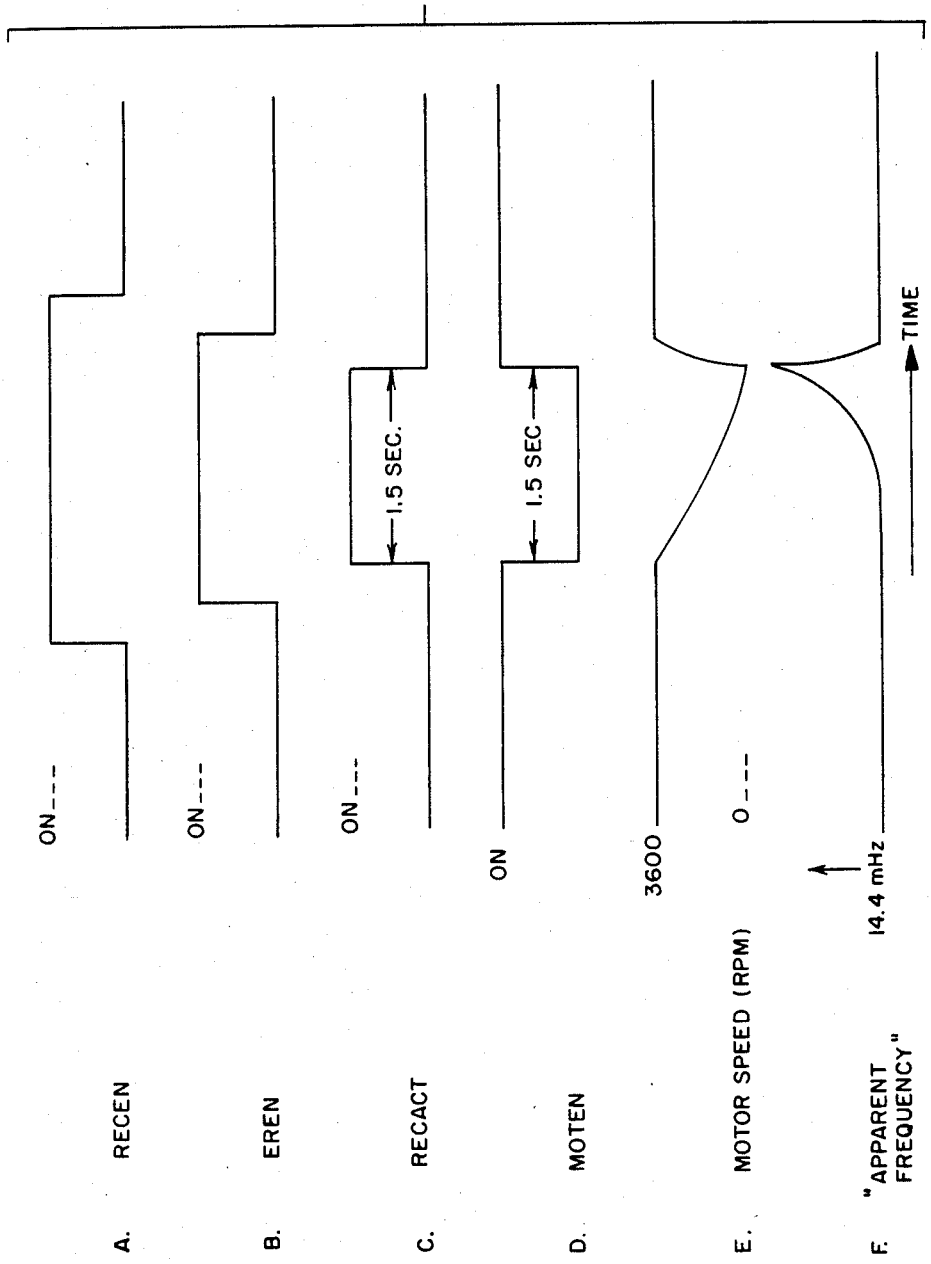

METHOD AND APPARATUS FOR ERASING A SIGNAL RECORDED ON A MAGNETIC DISK

FIELD OF THE INVENTION

The invention relates to the use of an alternating current for erasing a signal recorded on a magnetic medium, particularly a video signal recorded on a circular track of a magnetic disk.

BACKGROUND OF THE INVENTION

A magnetic disk may be employed for the storage of video pictures, for example, one video field per recorded track. It is sometimes desirable to erase a single track, that is, a single field of a recorded video picture, without disturbing the fields recorded on adjacent tracks. It is also important that most of the picture content be removed so that a new picture can be recorded on the erased track without interference from any recorded remnants of the old picture. Typically, the disk is rotated while the erasure takes place. An alternating current erasing signal is applied to a magnetic head that generates an erasing field. The head is closely positioned in relation to the rotating magnetic disk so that the erasing field interfaces with the track and erases the resident signal.

Particularly with a video signal having many high frequencies, it is desirable to use an erasing signal with even higher frequencies (for example, an erasing frequency exceeding 20 mHz for erasing recorded video frequencies). The frequency response of the electrical circuit processing the erasing signal ordinarily, however, bars the use of such high frequencies. One way of increasing the erasing frequency without exceeding the circuit's capability is to operate the disk at a lower rotational velocity than its normal record or playback velocity (see the background discussion in U.S. Pat. No. 3,723,668). This has the effect of impressing a relatively larger number of frequency alternations on a given track for a relatively lower frequency erasing current. Despite this technique, however, it is still difficult to erase all of the video picture content with obtainable erasing frequencies.

SUMMARY OF THE INVENTION

In the course of evaluating different erasing techniques, it was found that more picture content was erased by scanning the erasing frequency from a lower to a higher frequency, than by use of the higher frequency erasing current alone. The invention is based on the insight that the effect of frequency scanning can be obtained by variation of the rotational velocity of the disk. By applying a fixed frequency erasing current to the erasing head, and then decelerating the disk, the effect of scanning from a lower frequency to a higher frequency is obtained. The lower fixed frequency produced by the erasing circuit (say, 15 mHz) is within the circuit's frequency response while the higher of the frequencies (say, 30 mHz) "seen" by the disk may be well beyond the circuit's capability. Remnants of prior picture content, nonetheless, are effectively erased.

BRIEF DESCRIPTION OF THE DRAWINGS

The invention will be described with reference to the drawings, in which

FIG. 2 includes signal waveforms, of A-F, and system responses characteristic of the apparatus of FIG. 1.

DETAILED DESCRIPTION OF THE PREFERRED EMBODIMENT

Figure 1:
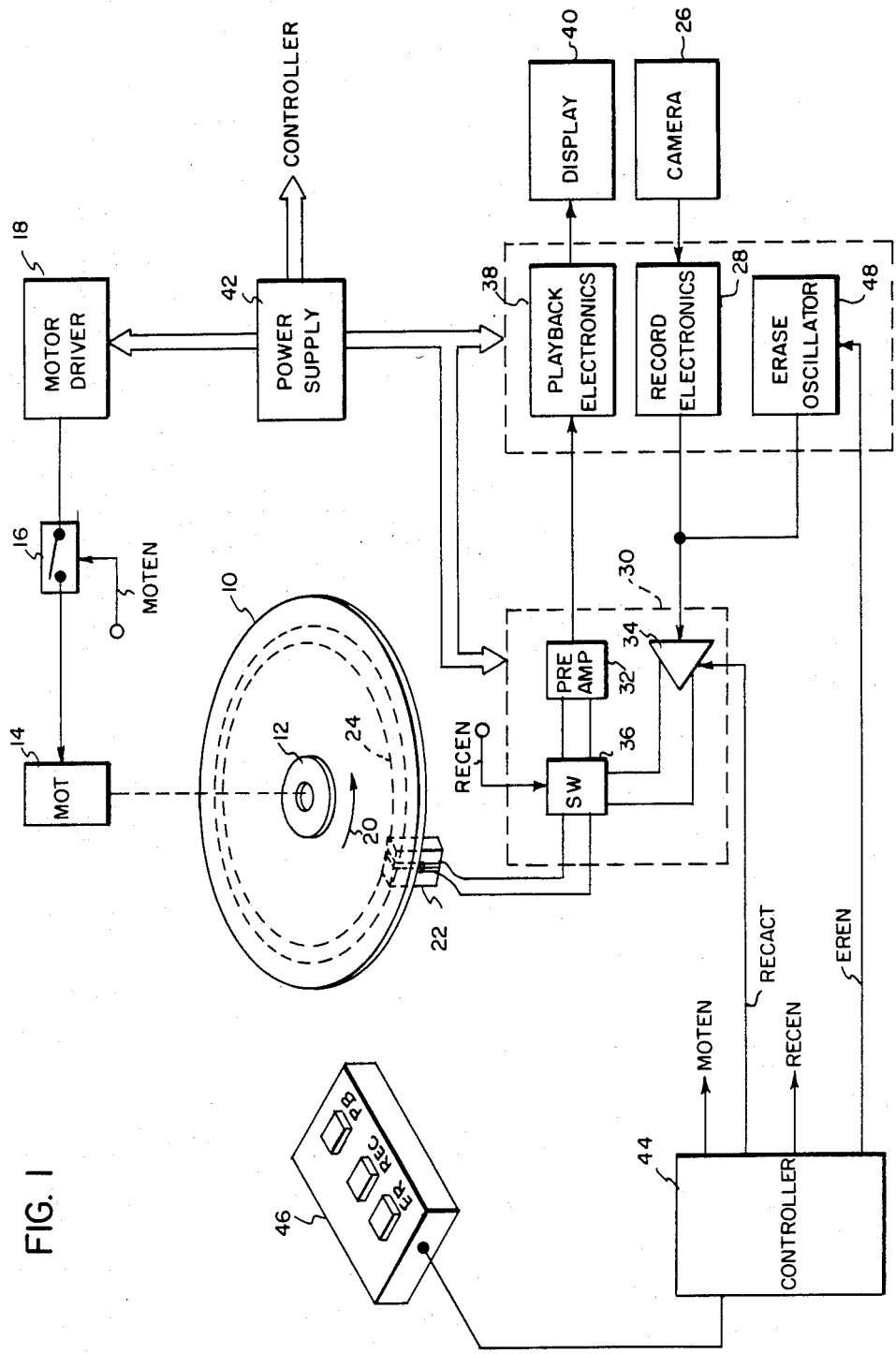
FIG. 1 is a block diagram of video disk apparatus employing an erasing method according to the invention.

Since apparatus for processing a video signal is well known, such as cameras and recorder/players of various kinds, the present description will be directed in particular to elements forming part of, or cooperating more directly with, the present invention. Elements of such apparatus not specifically shown or described herein may be selected from those known in the art. More particularly, since video apparatus utilizing magnetic disk media is well known, the mechanical drive system, the read/write circuit elements, and the head configuration may be selected from those known in the art.

FIG. 1 shows general details of a video player/recorder that utilizes a magnetic disk 10. The disk 10 is attached by its hub 12 to a spindle (shown by broken line) of a drive motor 14. The motor 14, which is driven via an enabling switch 16 connected to a motor driver 18, rotates the disk 10 in a direction indicated by an arrow 20. A motor enable signal MOTEN is directed to the switch 16 for turning the motor 14 on and off. A magnetic head 22 is closely positioned in relation to the rotating disk 10 so as to interface with a circular track area 24. The head 22 is useful for either recording a fresh signal on (or applying an erasing signal to) the track 24 or for playing back an already recorded signal. (Though one track 24 is shown, it is to be understood that the disk 10 supports many such tracks.)

The video signal intended for recording on the track 24 originates from any conventional video source, such as a video camera 26. The camera signal is provided to a record electronics module 28 for suitable, and conventional, processing. For example, the incoming signal is ordinarily used to modulate a carrier that is suitable for recording on the disk 10. The processed video signal from the record electronics module 28 is provided to a head input/output circuit 30, which includes a head preamplifier 32 for processing a playback signal, a head driver 34 for driving the head 22 with a recording signal, and a transistor switch 36 for connecting the head 22 to either the preamplifier 32 or the head driver 34. In order to record (or erase) a signal on the track 24, two enabling signals are provided to the head I/O circuit 30: a record enable signal RECEN is provided to the switch 36 to connect the head 22 into the record channel from the record electronics module 28 and a record activate signal RECACT provided to the head driver 34 to provide a suitably driven signal through the switch 36 to the head 22. These enabling signals, including the motor enable signal MOTEN, come from a controller 44, which may be a conventional microprocessor programmed to generate such signals at the appropriate times. The enabling signal waveforms are shown in FIG. 2, with the ON, or enable condition, represented by a HIGH voltage. Certain actions of the controller 44 relating to the functions of erase, record and playback are initiated by depressing buttons on a control panel 46.

During the recording process, the disk 10 is rotated at 3600 r.p.m. so that a video field is recorded on the track 24 during one revolution of the disk 10 (conventional circuitry for synchronizing the head I/O circuit 30 to a single revolution is not shown but is within the ordinary design skill of one familiar with this art). The recorded signal is played back by connecting the head I/O circuit 30 to a playback electronics module 38, which contains conventional limiters, demodulators, and like circuits. A signal thereupon sensed by the head 22 (as the disk 10 rotates) is routed via the switch 36 though the preamplifier 32 and the playback electronics module 38 to a video display 40. Power is supplied to the modules 28 and 38, the I/O circuit 30, the controller 44, and the motor driver 18 from a power supply 42.

A signal on the track 24 is erased by connecting an erase oscillator 48 to the magnetic head 22. When enabled by an erase enable signal EREN from the controller 44, the erase oscillator generates a fixed frequency ac erase signal and provides the erase signal to the head driver 34. The preferred frequency for the erase signal depends on the frequencies recorded on the track 24 and the frequency response of the apparatus, including the response of the head I/O circuit 30 and the frequency capability of the head 22. In the case of the preferred embodiment, an ac erase signal of 14.4 mHz was used in erasing video signals having a frequency range of 100 kHz to 12 mHz. The erase signal is routed into the recording channel in lieu of a signal originating from the camera. (The record electronics module 28 is deenergized or otherwise disconnected during the erasing period.) Since erasing is tantamount to recording, the head I/O circuit 30 is thus operated in its record mode during the erasing period.

The sequence of erase operations of the circuit of FIG. 1 can be understood by reference to the waveforms of FIG. 2. When the erase button on the control panel 46 is pressed, the record enable signal RECEN (waveform A) is set HIGH so that the switch 36 in the head I/O circuit 30 connects the head 22 to the head driver 34. Then the controller 44 sets the erase enable signal EREN HIGH (waveform B), thus energizing the erase oscillator 48 and providing the fixed frequency erase signal to the head driver 34 in head I/O circuit 30. To this point the head 22 is not receiving any erasing signal. When the record activate signal RECACT (waveform C) is set HIGH, the head driver 34 is enabled and the erase signal in the recording channel is applied to the head 22. Simultaneously, the motor enable signal MOTEN (waveform D) is set LOW and power to the motor 14 is cut off. The disk 10 is allowed to coast to a stop (no dynamic braking), which takes about 1.5 seconds. During this time the erase signal is applied to the track 24. As shown by the waveform E, the motor speed drops from 3600 r.p.m. to a full stop during the 1.5 seconds. In the meantime, as shown by the waveform F, the "apparent frequency" of the signal of the disk 10 (actually a measure of the number of frequency alternations impressed on the disk) quickly rises to a high figure.

When the erasing period (1.5 seconds) is over, the record activate signal RECACT (waveform C) is set LOW and the motor enable signal MOTEN (waveform D) is set HIGH (erasure stops and the disk 10 resumes rotation). A short time thereafter the erase enable signal EREN (waveform B) is set LOW (the erase oscillator 48 is deenergized). The record enable signal RECEN (waveform A) is then set LOW, which takes the head I/O circuit 30 out of the record mode (and into the playback mode). While the erase enable signal EREN, the record activate signal RECACT and the motor enable signal MOTEN should have waveforms that behave relative to each other as shown by FIG. 2, it is only intended in the preferred embodiment that the record enable signal RECEN be HIGH for the period beginning shortly before and continuing until shortly after the erasing period. The record enable signal RECEN, therefore, may have been HIGH (record enabled) long before erasure begins and, conversely, does not have to be set LOW (playback enabled) following erasure.

By following the above procedure, the original video signal recorded on the track 24 is sufficiently erased that a new video signal recorded on the same track shows, upon playback, no evidence of interference from the original recording. The best results were obtained with an erase frequency of about 15 mHz (14.4 mHz in the described embodiment) and a recording current about 100 ma., peak-to-peak. (The optimum recording current is an empirical determination based in part on the type of magnetic head used.) The erase signal was applied to the head 22 while the disk 10 was decelerated from 3600 r.p.m. to a dead stop. This is comparable to scanning the track 24 with a rapidly increasing series of frequencies, starting at 14.4 mHz. Good results were also obtained by decreasing the motor velocity from 3600 r.p.m. to 1800 r.p.m. while applying the same erasing signal (an erase frequency of about 15 mHz and a current of about 100 m.a. peak-to-peak). Whichever method of deceleration was used, tracks adjacent to the erased track 24 showed no loss of signal.

The invention has been described in detail with particular reference to a presently preferred embodiment, but it will be understood that variations and modifications can be effected within the spirit and scope of the invention. For instance, while the described frequencies, currents, and velocity ranges appear optimum for the particular recorded frequencies used it is obvious that other combinations of frequencies, currents, and velocity ranges may be used with varying effects according to the invention. In particular, other erase frequencies and currents may be better suited for other recorded frequencies. In addition, though the disk 10 was not dynamically braked once the motor 14 was deenergized, braking is not necessarily detrimental to an acceptable result. Indeed, the free deceleration contemplated by the invention is an uncontrolled frictional braking.

What is claimed is:

1. A method of erasing a signal recorded on a recirculating track on a rotating magnetic medium, said method comprising the steps of:
   generating an alternating current erasing signal; and
   decelerating the medium while applying said erasing signal to the track during an erasing interval that is substantially coterminous with said deceleration of the medium.

2. The method as claimed in claim 1 in which the medium is decelerated to a stop.

3. A method of erasing a signal recorded on a recirculating track on a rotating magnetic disk supported in relation to a magnetic head, said method comprising the steps of:
   generating a fixed frequency erasing signal; and
   applying said erasing signal to the head during an erasing interval while reducing the rotational velocity of the disk during a deceleration interval that is substantially coextensive with said erasing interval.

4. The method as claimed in claim 3 in which the rotational velocity of the disk is reduced to zero during said deceleration interval.

5. The method as claimed in claim 3 in which the frequency of said erasing signal exceeds the highest frequency of the recorded signal.

6. A method of erasing a video signal recorded on a circular track on a magnetic disk supported for rotation in relation to a recording head that interfaces with the track, said method comprising the steps of:
rotating the disk at a predetermined rotational velocity;
generating an erasing signal having a frequency that exceeds the highest recorded video frequency; and
applying said erasing signal to the recording head during an erasing interval while continuously slowing said rotational velocity of the disk over said interval, thereby erasing the video signal recorded on the track as the medium is decelerated.

7. The method as claimed in claim 6 in which the disk is slowed to a stop while said erasing signal is applied to said recording head.

8. The method as claimed in claim 1 in which said erasing interval ends before the medium is decelerated to a stop.

9. Apparatus for erasing a signal recorded on a track on a magnetic disk, said apparatus comprising:
a magnetic head;
means for generating an alternating current erasing signal;
means for supporting said magnetic head in relation to the magnetic disk so that said head is capable of interacting with the track;
means for rotating the magnetic disk at a predetermined rotational velocity;
means for generating a track erase instruction that defines a predetermined erase interval;
means responsive to said track erase instruction for decelerating the magnetic disk during said erase interval; and
means for applying the erasing signal to said magnetic head during said erase interval while the magnetic disk is decelerating.

10. Apparatus as claimed in claim 9 in which said decelerating means brings the magnetic disk to a full stop and in which said signal applying means applies the erasing signal to said magnetic head while the magnetic disk is decelerating from said predetermined rotational velocity toward a full stop.

11. Apparatus as claimed in claim 9 in which said means responsive to said track erase instruction includes means for deenergizing said rotating means and said means for applying the erasing signal applies said erasing signal to said magnetic head while said rotating means is deenergized.

12. Apparatus as claimed in claim 11 in which said rotating means is reenergized before the magnetic disk has come to a full stop.

* * * * *